(12) United States Patent
Morrill et al.

(10) Patent No.: US 9,094,844 B2
(45) Date of Patent: *Jul. 28, 2015

(54) METHOD AND APPARATUS FOR CONFIGURING A UNIVERSAL FEMTO CELL

(75) Inventors: Robert J. Morrill, Overland Park, KS (US); Carl M. Coppage, Kansas City, MO (US)

(73) Assignee: CenturyLink Intellectual Property LLC, Denver, CO (US)

(*) Notice: Subject to any disclaimer, the term of this patent is extended or adjusted under 35 U.S.C. 154(b) by 1925 days.

This patent is subject to a terminal disclaimer.

(21) Appl. No.: 11/897,937

(22) Filed: Aug. 31, 2007

(65) Prior Publication Data

US 2009/0061924 A1 Mar. 5, 2009

(51) Int. Cl.
- H04W 24/02 (2009.01)
- H04L 29/06 (2006.01)
- H04W 12/06 (2009.01)
- H04W 84/04 (2009.01)
- H04W 92/10 (2009.01)

(52) U.S. Cl.
CPC ........... *H04W 24/02* (2013.01); *H04L 63/08* (2013.01); *H04L 63/10* (2013.01); *H04W 12/06* (2013.01); *H04W 84/045* (2013.01); *H04W 92/10* (2013.01)

(58) Field of Classification Search
CPC ... H04W 12/06; H04W 24/02; H04W 84/045; H04W 88/08; H04W 88/10; H04W 92/10; H04L 63/08; H04L 63/10
USPC ............ 370/331–334; 455/436–444, 422.1, 455/446, 561
See application file for complete search history.

(56) References Cited

U.S. PATENT DOCUMENTS

| | | | |
|---|---|---|---|
| 6,961,559 B1 | 11/2005 | Chow et al. | |
| 7,046,782 B2 | 5/2006 | Miller | |
| 7,623,857 B1 * | 11/2009 | O'Neil et al. | 455/426.1 |
| 8,295,215 B2 | 10/2012 | Morrill et al. | |
| 8,447,277 B2 | 5/2013 | Sweeney et al. | |
| 8,571,532 B2 | 10/2013 | Sweeney et al. | |
| 8,583,078 B2 | 11/2013 | Sweeney et al. | |
| 8,768,317 B2 | 7/2014 | Sweeney et al. | |
| 8,868,058 B2 | 10/2014 | Morrill | |
| 2002/0032641 A1 | 3/2002 | Mendiola et al. | |
| 2003/0018572 A1 | 1/2003 | Beschle et al. | |

(Continued)

OTHER PUBLICATIONS

U.S. Appl. No. 12/471,708; Non-Final Rejection dated May 2, 2014; 52 pages.

(Continued)

*Primary Examiner* — George Eng
*Assistant Examiner* — Marcus Hammonds
(74) *Attorney, Agent, or Firm* — Swanson & Bratschun, L.L.C.

(57) ABSTRACT

A method, apparatus, and computer usable program product for configuring a universal femto cell are provided such that the femto cell is configured according to the user's choice of wireless carriers. A master configuration server sends to the universal femto cell, a carrier configuration list, which is information about where to find carrier configuration information corresponding to one or more wireless carriers. A carrier configuration server sends to the universal femto cell, carrier configuration instructions for a wireless carrier selected from the one or more wireless carriers. The universal femto cell is configured using the carrier configuration instructions such that the universal femto cell operates on a wireless communication network of the wireless carrier.

30 Claims, 6 Drawing Sheets

(56) References Cited

U.S. PATENT DOCUMENTS

| | | |
|---|---|---|
| 2003/0050854 A1 | 3/2003 | Showghi et al. |
| 2003/0181209 A1 | 9/2003 | Forte |
| 2004/0204097 A1* | 10/2004 | Scheinert et al. ............. 455/561 |
| 2004/0229621 A1 | 11/2004 | Misra |
| 2005/0254451 A1* | 11/2005 | Grosbach ..................... 370/328 |
| 2006/0036868 A1 | 2/2006 | Cicchitto |
| 2007/0079113 A1 | 4/2007 | Kulkarni et al. |
| 2007/0167170 A1 | 7/2007 | Fitchett et al. |
| 2008/0043993 A1 | 2/2008 | Johnson |
| 2008/0220779 A1* | 9/2008 | Bose ........................... 455/436 |
| 2008/0311943 A1 | 12/2008 | Earl |
| 2009/0059822 A1 | 3/2009 | Morrill et al. |
| 2009/0141884 A1 | 6/2009 | Lyman |
| 2009/0156213 A1 | 6/2009 | Spinelli et al. |
| 2009/0164547 A1 | 6/2009 | Ch'ng et al. |
| 2009/0191844 A1 | 7/2009 | Morgan et al. |
| 2009/0296641 A1 | 12/2009 | Bienas et al. |
| 2010/0041365 A1 | 2/2010 | Lott et al. |
| 2010/0167694 A1 | 7/2010 | Chiussi et al. |
| 2010/0234004 A1 | 9/2010 | Sweeney et al. |
| 2010/0304764 A1 | 12/2010 | Sweeney et al. |
| 2011/0004747 A1 | 1/2011 | Venkatachalam |
| 2011/0045835 A1 | 2/2011 | Chou et al. |
| 2011/0207461 A1 | 8/2011 | Lundqvist et al. |
| 2012/0046025 A1 | 2/2012 | Das et al. |
| 2012/0052793 A1 | 3/2012 | Brisebois et al. |
| 2013/0223284 A1 | 8/2013 | Davies et al. |
| 2014/0051411 A1 | 2/2014 | Sweeney et al. |
| 2014/0066012 A1 | 3/2014 | Sweeney et al. |
| 2014/0256359 A1 | 9/2014 | Sweeney et al. |
| 2015/0011201 A1 | 1/2015 | Morrill |

OTHER PUBLICATIONS

U.S. Appl. No. 13/689,892; Non-Final Rejection dated Feb. 28, 2014; 17 pages.

U.S. Appl. No. 13/689,892; Notice of Allowance dated Jun. 20, 2014; 18 pages.

U.S. Appl. No. 13/689,892; Notice of Publication dated Jun. 5, 2014; 1 page.

U.S. Appl. No. 13/872,465; Notice of Allowance dated Feb. 19, 2014; 22 pages.

U.S. Appl. No. 14/058,673; Notice of Publication dated Feb. 20, 2014; 1 page.

U.S. Appl. No. 14/075,072; Non-Final Rejection dated Feb. 12, 2014; 54 pages.

U.S. Appl. No. 14/281,514; Notice of Allowance dated Jan. 23, 2015; 29 pages.

U.S. Appl. No. 14/281,514; Notice of Allowance dated Oct. 9, 2014; 24 pages.

U.S. Appl. No. 14/281,514; Notice of Publication dated Sep. 11, 2014; 1 page.

U.S. Appl. No. 14/492,141; Notice of Publication dated Jan. 8, 2015; 1 page.

U.S. Appl. No. 14/058,673; Non-Final Rejection dated Apr. 2, 2015; 28 pages.

U.S. Appl. No. 14/281,514; Notice of Allowance dated May 13, 2015; 40 pages.

\* cited by examiner

Figure 6

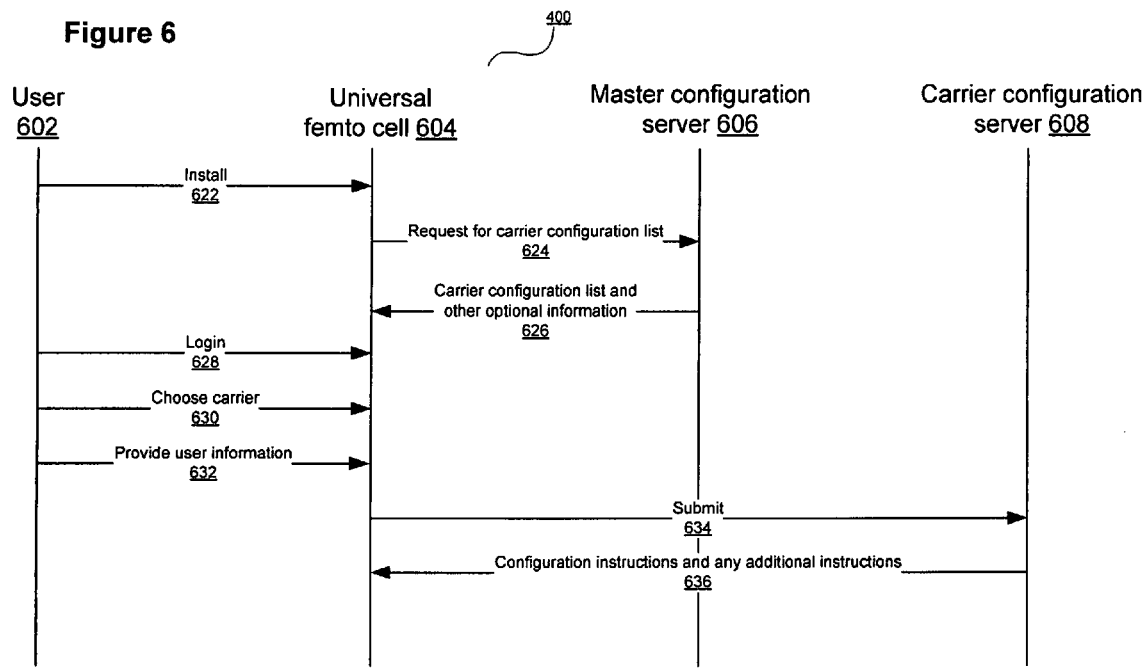

Figure 7

| Wireless carrier 702 | Wireless carrier's URL for femto cell configuration 704 | Wireless carrier's technical support website 706 | Wireless carrier's phone number 708 |
|---|---|---|---|
| Alltel | FC_Configuration_Server.alltel.com | www.FC_HELP.alltel.com | 800.xxx.xxxx |
| Sprint | FC_Configuration_Server.Sprint.com | www.FC_HELP.Sprint.com | 800.xxx.xxxx |
| Verizon | FC_Configuration_Server.Verizon.com | www.FC_HELP.verizon.com | 800.xxx.xxxx |
| xyz Company | FC_Configuration_Server.xyzCompany.com | www.FC_HELP.xyzCompany.com | 800.xxx.xxxx |
| ... | ... | ... | ... |
| ... | ... | ... | ... |

METHOD AND APPARATUS FOR CONFIGURING A UNIVERSAL FEMTO CELL

BACKGROUND

1. Field of the Invention

The principles of the present invention relate generally to an improved telecommunications system, and in particular, to an improved configuration of a telecommunications system for wireless communications. Still more particularly, the principles of the present invention relate to configuring a universal femto cell, and method and computer usable program product for configuring a universal femto cell.

2. Description of the Related Art

Wireless communication, such as with a wireless phone, use a network of antenna towers. An antenna tower is a radio frequency antenna mounted on a tower, or other mounting structure, such as a side of a building. A wireless communication device is a device that enables a user to establish a wireless communication for voice, video, or data. The wireless communication device communicates with the antenna tower for establishing the wireless communication. A cellular phone is an example of a wireless communication device.

An antenna tower sends and receives wireless signals to and from a wireless communication device to facilitate wireless communication. The antenna tower includes equipment called Base Transceiver Station equipment (BTS). A BTS is radio equipment that uses the antenna tower for facilitating radio communication with wireless communication devices. The BTS communicates with other equipment on a wireless carrier's network to connect those wireless communications devices with other devices.

A wireless communication device has to be in proximity of an antenna tower to use the wireless communication services of a wireless carrier. Power of the BTS and the design of the wireless network determines the distance from the antenna tower at which a wireless communication device can be expected to work in an intended manner. The lower the power of a BTS, the smaller the distance from the antenna tower will be within which wireless communication can be established using that antenna tower.

A wireless carrier plans the locations of antenna towers such that radio communications between wireless communication devices and the BTS of the antenna tower, or coverage, is possible in an intended region. The plan of the locations of the antenna towers in a region is called a cell design. The area within a coverage region that is covered by a particular antenna tower is called a cell. Generally, the cell design is intended to provide coverage at all locations within each cell. However, as consumers of wireless services are familiar, areas within a cell called dead zones can experience limited or no coverage, resulting in failed or interrupted wireless communication, or wireless communication of less than desirable quality. Structural and topological features of a terrain may also prevent wireless signals from reaching from an antenna tower to a wireless communication device and vice-versa. These structural and topological features are called signal disturbers. Some examples of signal disturbers are buildings, multiple walls, tall structures, metallic structures, and metallic film coverings, such as on windows. Signal disturbers can disrupt the wireless signals even though a wireless communication device may be within communication range of an antenna tower.

As a solution to these problems, wireless carriers configure smaller cells within a cell's dead zone. Wireless carriers install equipment called a pico cell or a femto cell (hereinafter, collectively referred to as "femto cell"), which is a radio communications device that improves the coverage into the dead zones. A femto cell includes the functionality of a BTS, an antenna tower, and certain other equipment in the wireless communication network. A femto cell is provided, and the femto cell's location is determined, by a specific wireless carrier so that the particular femto cell may operate on the wireless carrier's wireless communication network. Femto cells are different from wireless LAN technologies such as IEEE 802.11a/b/g/n in that femto cells operate using the same frequency and protocols as the macro wireless carrier. Often these frequencies are licensed by the government and are protected by law from unauthorized use. In addition, femto cells participate in the wireless carriers coverage plans, including identifying other nearby towers, adjusting their transmit power requirements accordingly, and performing inter-tower call hand-off.

SUMMARY

To enable a user to configure a femto cell according to the user's choice of locations and the user's choice of wireless carriers, the illustrative embodiments provide a method, apparatus, and computer usable program product for configuring the universal femto cell. In one embodiment, a master configuration server sends to the universal femto cell, a carrier configuration list, which is information about where to find carrier configuration information corresponding to one or more wireless carriers. A carrier configuration server sends to the universal femto cell, carrier configuration instructions for a wireless carrier selected from the one or more wireless carriers. The universal femto cell is configured using the carrier configuration instructions such that the universal femto cell operates on a wireless communication network of the wireless carrier.

In another embodiment, the master configuration server also provides optional information including one or more of contact information, firmware update, driver update, software update, an information bulletin, advertisement, marketing message, and welcome message. In another embodiment, the carrier configuration server also provides additional instructions including instructions for one or more of testing functions, diagnostic functions, corrective functions, post-configuration functions, and informative functions.

In another embodiment, the master configuration server authenticates the universal femto cell and the carrier configuration server authenticates one or more of the user who is configuring the universal femto cell, and the universal femto cell. In another embodiment, the master configuration server and the carrier configuration server are one and the same.

BRIEF DESCRIPTION OF THE DRAWINGS

The novel features believed characteristic of the illustrative embodiments are set forth in the appended claims. The illustrative embodiments, however, as well as a preferred mode of use, will best be understood by reference to the following detailed description of an illustrative embodiment when read in conjunction with the accompanying drawings, wherein:

FIG. 6 depicts a timing diagram of an exemplary operation of an improved wireless communication network in accordance with an illustrative embodiment;

FIG. 7 depicts an exemplary carrier configuration list maintained by a master configuration server in accordance with an illustrative embodiment.

DETAILED DESCRIPTION OF THE DRAWINGS

Figure 1:
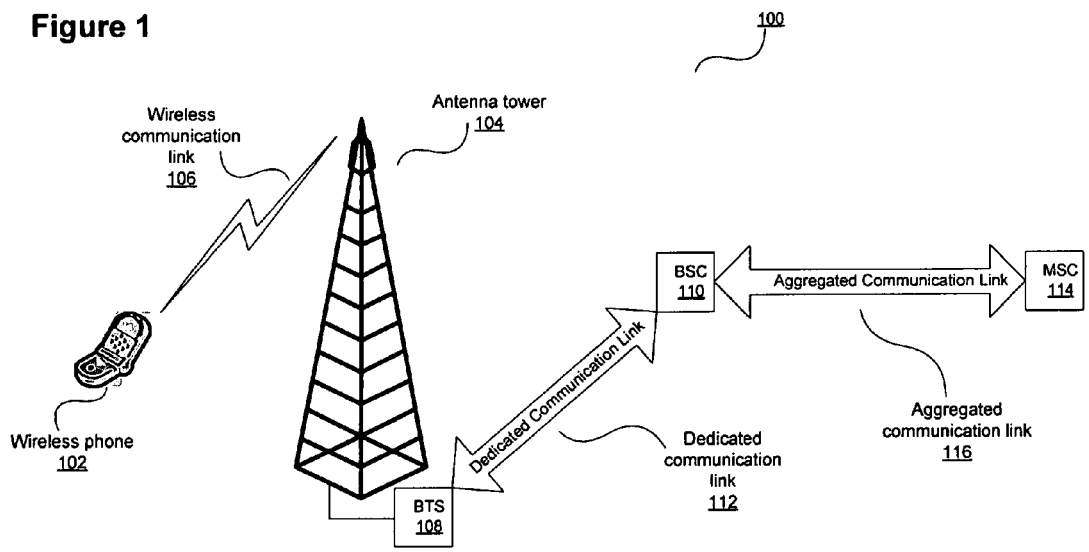
FIG. 1 depicts an illustration of a presently used wireless communication network in which the illustrative embodiments may be implemented.

The present disclosure incorporates simultaneously filed U.S. application Ser. No. 11/897,980 (the "'980 Application"), filed on Aug. 31, 2007, by Robert J. Morrill et al., and entitled, "Universal Femto Cell", the entire disclosure of which is incorporated herein by reference.

Presently, a wireless carrier provides a femto cell that operates on the wireless carrier's own wireless communication network. Frequently, a wireless carrier also determines the type of femto cell equipment and the femto cell's location of installation. Therefore, illustrative embodiments recognize that a user of a wireless carrier's services is presently dependent on the wireless carrier to select, provide, configure, and operate a femto cell. The illustrative embodiments further recognize that in circumstances where a user uses multiple wireless carriers' services, the user's dependencies described above increase with the number of wireless carriers.

In order to solve these and other problems with wireless carrier provided femto cells, the illustrative embodiments describe a method, apparatus, and computer usable program product for configuring a universal femto cell. A universal femto cell is a femto cell that is configurable to operate on any wireless communication network that supports femto cells. A user can procure, configure and operate the universal femto cell of the illustrative embodiments according to the user's preferences. For example, a user may be able to buy a universal femto cell from a retailer, and configure the universal femto cell to improve coverage in a dead zone inside the user's home. Particular implementations of the illustrative embodiments can also enable a user to configure a universal femto cell to operate on multiple wireless communication networks.

The universal femto cell of the illustrative embodiments is capable of functioning as an antenna tower, a BTS, a networking device, other equipment used in a wireless communication network or any combination thereof. A networking device is a modem, adapter, router, or a switch commonly used for connecting a data processing system to a network, such as the Internet. Examples of a networking device include but are not limited to telephone modems, cable modems, digital subscriber line (DSL) modems, and other broadband modems.

Other equipment used in a wireless communication network includes but is not limited to Base Station Controller (BSC), which communicates with one or more BTS as described below. A particular implementation of the illustrative embodiments may include the functionality of a wireless communication device within the described universal femto cell.

As described above, a universal femto cell is capable of operating on a variety of wireless communication networks. However, to be able to operate on a wireless communication network the universal femto cell needs certain information. The illustrative embodiments describe a method of configuring the universal femto cell such that the universal femto cell is able to operate on a desired wireless communication network.

With reference to the figures, and in particular with reference to FIG. 1, exemplary diagrams of data processing environments are provided in which illustrative embodiments may be implemented. FIG. 1 is not intended to assert or imply any limitation with regard to the environments in which different embodiments may be implemented. Many modifications to the depicted environments may be made.

FIG. 1 depicts an illustration of a presently used wireless communication network in which the illustrative embodiments may be implemented. Wireless communication network 100 is a schematic configuration of a wireless communication network presently in use for wireless communications. Wireless phone 102 is an exemplary wireless communication device. Wireless phone 102 communicates with antenna tower 104 using wireless communication link 106. BTS 108 is the BTS equipment that uses antenna tower 104 for providing wireless communication services to wireless phone 102.

BTS 108 communicates with BSC 110 using dedicated communication link 112. A BSC is equipment in a wireless communication network that is responsible for handling traffic and signaling between a wireless communication device and the network switching subsystem of the wireless carrier. A dedicated communication link is a section of the wireless communication network providing connectivity between one or more BTSs and one or more BSCs in the wireless carrier's network.

BSC 110 communicates with Mobile Switching Center (MSC) 114 using aggregated communication link 116. MSC is one or more pieces of equipment in a wireless communication network that carries out switching functions and manages the communications between wireless communication devices and the Public Switched Telephone Network (PSTN). PSTN is the traditional telephone network. An aggregated communication link is a section of the wireless communication network providing connectivity between one or more BSCs and one or more MSCs. Aggregated communication link 116 may include a public network such as the Internet.

Figure 2:
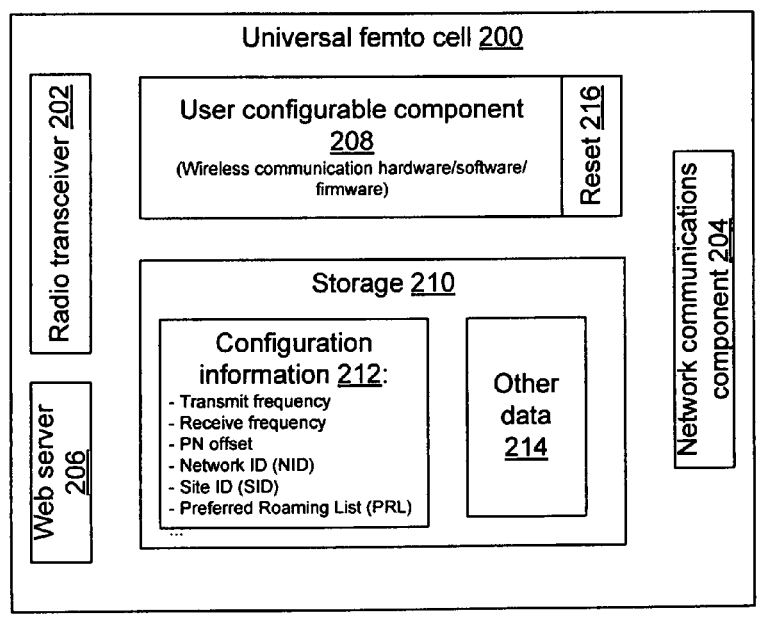
FIG. 2 depicts a block diagram of a universal femto cell in accordance with an illustrative embodiment.

With reference to FIG. 2, this figure depicts a block diagram of a universal femto cell in accordance with an illustrative embodiment. Universal femto cell 200 may be used for improving coverage in dead zones in wireless communication network 100 in FIG. 1.

Universal femto cell 200 includes radio transceiver 202 for communicating with wireless communication devices Network communications component 204 communicates with a data network such as a local area network (LAN) Ethernet network that may connect to the Internet over a broadband network Web server 206 is an exemplary component for facilitating a user's interactions with universal femto cell 200. Using web server 206, universal femto cell 200 may display information to a user and accept information from the user, as described with respect to FIG. 4, below. Other methods of interacting with the user may substitute for web server 206. For example, a set of lights and buttons, a built in liquid crystal display (LCD) with buttons or touch-screen, or other methods for input/output of information may be used in place of web server 206.

Universal femto cell 200 includes user configurable component 208, which includes wireless communication hardware/software/firmware. As different from wireless communication hardware/software/firmware in existing wireless carrier provided femto cells, user configurable component 208 is configurable by a user to operate on one or more wireless communication networks that support femto cells.

Universal femto cell 200 further includes storage 210, which stores configuration information 212 and other data 214 as may be needed. Storage 210 may be a readable writable data storage medium such as memory, hard disk, or other suitable storage media. Furthermore, configuration information 212 may reside in storage 210 or in a different location or removable media, such as a compact disc or a flash storage card.

Configuration information 212 may include information for suitably operating universal femto cell 200 on a wireless communication network of the user's choice. For example, configuration information 212 may include network and wireless technology specific configurations, such as a specification for transmit frequency for radio transmission to a wireless communication device, a specification for receive frequency for receiving the radio transmission from the wireless communication device, and specifications for specific wireless technology such as code division multiple access (CDMA), Global System for Mobile communications/Groupe Spécial Mobile (GSM), or other wireless technology. Configuration information 212 may further include a Pseudo Noise offset (PN offset). PN offsets are analogous to television channel numbers, and each sector of each cell site has a different offset. PN offsets can change but are unique within a cell site. Even though PN offsets are unique, they are usually repeated at great enough distances that a signal from a cell site with a certain PN offset is not confused with a signal from another site far away.

Configuration information 212 may further include a network identifier (network ID), and a site identifier (site ID). The specific items of information contained in configuration information 212 and described above are only exemplary and not intended to be limiting on the illustrative embodiment. These items have been selected for the clarity of the description of the illustrative embodiment. A specific implementation of the illustrative embodiment may add, modify, remove, substitute, or combine these and other items of information that may be useful in configuring universal femto cell 200.

Furthermore, a specific implementation of the illustrative embodiment may include additional components in universal femto cell 200. For example, network communications component 204 may include a broadband modem to connect to a broadband data network. As another example, universal femto cell 200 may include a Global Positioning System (GPS) receiver to assist universal femto cell 200 in maintaining synchronization with other towers within the wireless network. Many other augmentations and combinations are conceivable from the illustrative embodiments in this disclosure.

Additionally, a reset mechanism may also be provided in universal femto cell 200 for resetting the configuration. Reset 216 is a reset mechanism and may be implemented in a variety of ways. For example, reset 216 may be a hardware reset button, software instructions available via the user interface, or other ways of instructing universal femto cell 200 to reset the configuration. Generally, reset 216 may be included to reset the universal femto cell to a default configuration. One default configuration may be the state of the universal femto cell when the universal femto cell is not configured to operate on any particular wireless network. Other default configurations, such as configuring to operate on one particular wireless network, may also be implemented. Resetting to a default configuration allows a user to reconfigure the universal femto cell, such as for operating on a new wireless carrier, selling the universal femto cell to another user, or reconfiguring the universal femto cell in case of a corrupted configuration. An implementation of universal femto cell of the illustrative embodiments may maintain the configuration such that a power outage may not erase or reset the configuration.

Figure 3:
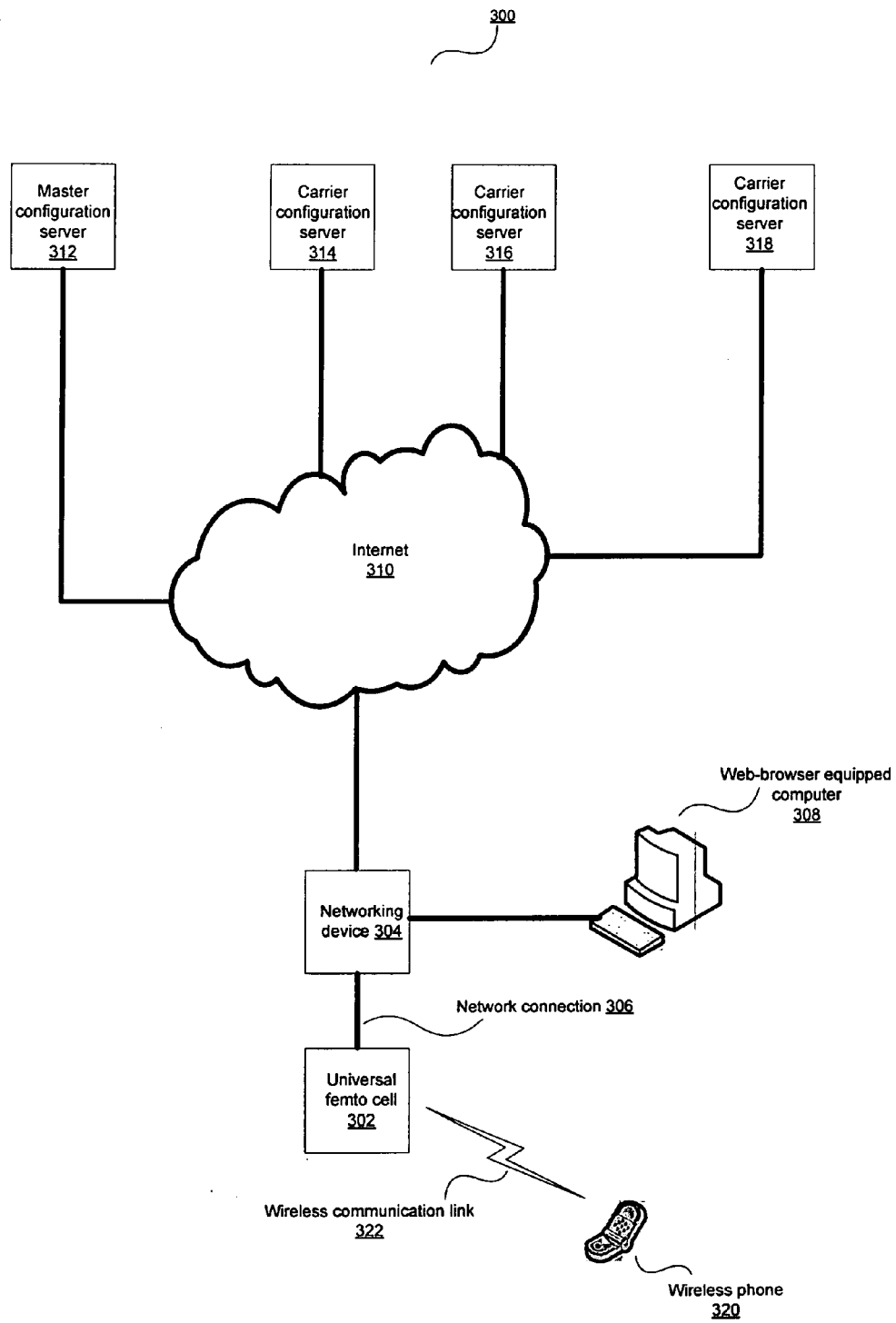
FIG. 3 depicts a block diagram of an improved wireless communication network using universal femto cell in accordance with an illustrative embodiment.

With reference to FIG. 3, this figure depicts a block diagram of an improved wireless communication network using universal femto cell in accordance with an illustrative embodiment. Improved wireless communication network 300 may be implemented using wireless communication network 100 in FIG. 1 in conjunction with universal femto cell 200 in FIG. 2.

Universal femto cell 302 is in communication with networking device 304 using network connection 306. Networking device 304 is a networking device as described above. Network connection 306 may be a local area network (LAN) connection over Ethernet, Wi-Fi, Wi-Max, or any other suitable type of communication channel including a connection to a wide area network (WAN) such as to an Internet service provider's (ISP) network. Furthermore, as described above, universal femto cell 302 and networking device 304 may be combined together in an implementation of the illustrative embodiments.

Other data processing systems may also be in communication with networking device 304. Web-browser equipped computer 308 is an example of such a data processing system that may be in communication with networking device 304 using Ethernet, Wi-Fi, Wi-Max, or other network connections.

Networking device 304 provides connectivity to Internet 310. Master configuration server 312 is a data processing system capable of communicating with universal femto cells over Internet. Master configuration server 312 maintains a carrier configuration list. A carrier configuration list is information about where to find carrier configuration information corresponding to one or more wireless carriers that support femto cells on their wireless communication networks. Carrier configuration information is information specific to a wireless carrier that has to be used for operating a device on the wireless carrier's wireless communication network. For example, master configuration server 312 may maintain names, IP addresses for femto cell configuration information, and other information, such as femto cell specific help pages and wireless carrier specific help pages, in the carrier configuration list. FIG. 7 shows an exemplary carrier configuration list.

Carrier configuration servers 314, 316, and 318 are data processing systems capable of communicating with universal femto cells over the Internet. Each carrier configuration server, such as carrier configuration server 314, is operated by a specific wireless carrier or carrier partner as in the case of Mobile Virtual Network Operators (MVNO) and/or Business Affiliates, and maintains information about configuring a universal femto cell to operate on that wireless carrier's wireless communication network Once configured, wireless communication devices, such as wireless phone 320, may establish wireless communications using wireless communication link 322 with universal femto cell 302.

Figure 4:
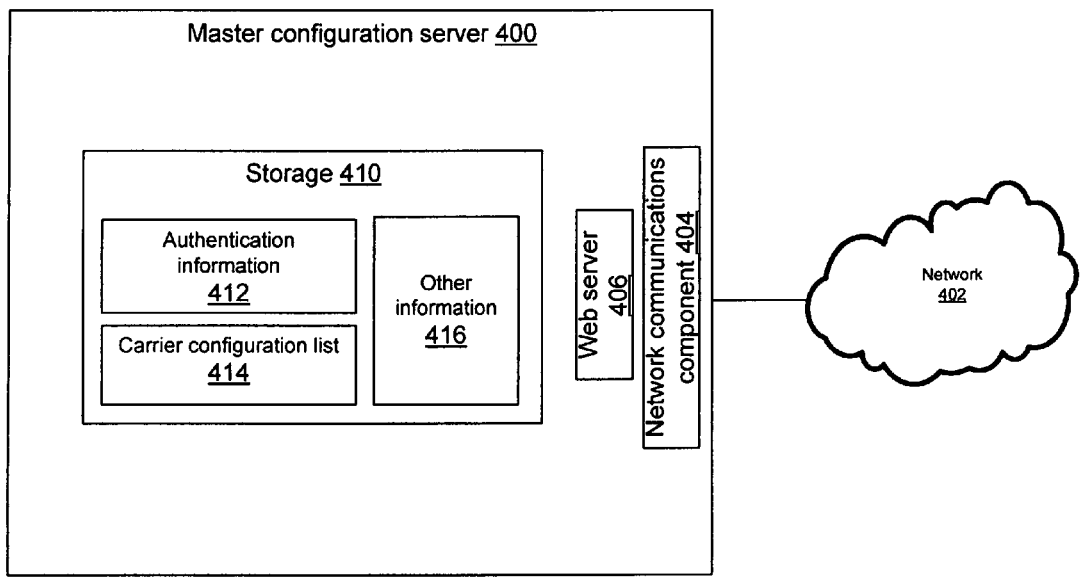
FIG. 4 depicts a block diagram of a master configuration server in accordance with an illustrative embodiment.

With reference to FIG. 4, this figure depicts a block diagram of a master configuration server in accordance with an illustrative embodiment. Master configuration server 400 may be used as master configuration server 312 in FIG. 3.

Master configuration server 400 is a data processing system that communicates with other data processing systems, including universal femto cells such as universal femto cell 200 in FIG. 2, using network 402. Network 402 may be a data network such as the Internet. Master configuration server 400 includes network communications component 404 that communicates with a network, such as network 402. Web server 406 is an exemplary component for facilitating a user's interactions with master configuration server 400. Using web server 406, master configuration server 400 may present information and accept information from the user, such as a system administrator. Web server 406 may be an optional component in a particular implementation of master configuration server 400.

Alternatively, other methods of interacting with the user may substitute for web server 406. For example, a set of lights and buttons, a built in liquid crystal display (LCD) with buttons or touch-screen, or other methods for input/output of information may be used in place of web server 406.

Master configuration server 400 includes storage 410, which stores authentication information 412, carrier configuration list 414, and other information 416. Storage 410 may be a readable writable data storage medium such as memory, hard disk, or other suitable storage media. Furthermore, any of authentication information 412, carrier configuration list 414, and other information 416 may reside in storage 410, or in a different location, or removable media, such as a compact disc or a flash storage card.

Authentication information 412 may include identifying information that identifies a universal femto cell that requests carrier configuration list 414. For example, a universal femto cell may have a unique media access control (MAC) address, which may uniquely identify the universal femto cell to master configuration server 400. Alternatively, a make, model, serial number, or other suitable identifier may be used for identifying the universal femto cell to master configuration server 400. Authentication information 412 may be used to verify that the universal femto cell requesting carrier configuration list 414 is allowed to receive it in response. Authentication information 412 may also be used to simply keep track of statistics, such as—which universal femto cells, or how many universal femto cells requested carrier configuration list 414.

Carrier configuration list 414 is a carrier configuration list as described above, and in further detail in FIG. 7. Other information 416 may be any other information that is used by master configuration server 400. Other information 416 may be information that is transmitted by master configuration server 400 to a universal femto cell, such as a firmware update, a driver update, a software update, an information bulletin, a welcome message or screen, a marketing message, an advertisement, and other similar information.

Figure 5:
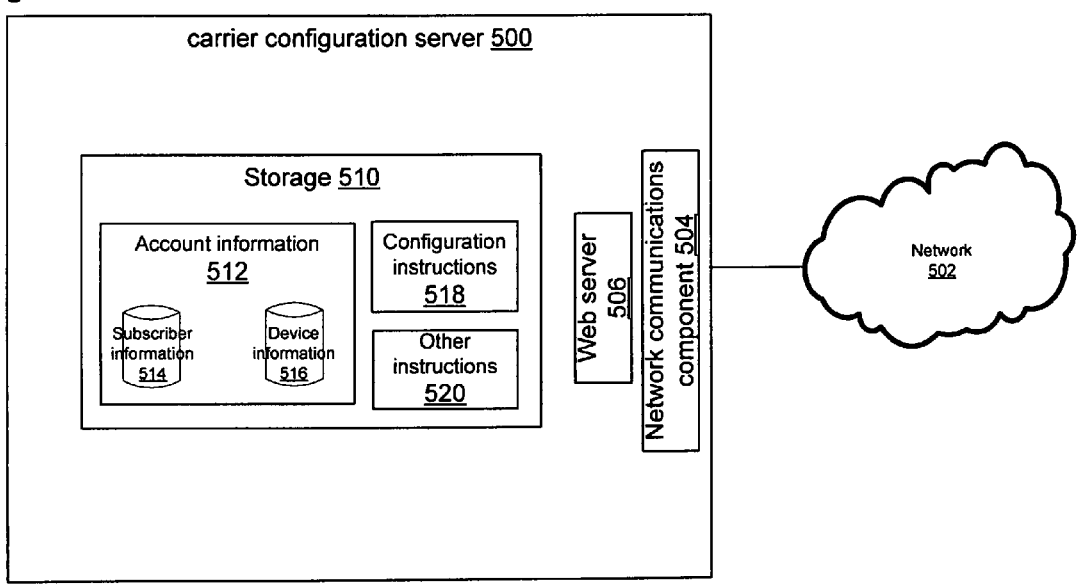
FIG. 5 depicts a block diagram of a carrier configuration server in accordance with an illustrative embodiment.

With reference to FIG. 5, this figure depicts a block diagram of a carrier configuration server in accordance with an illustrative embodiment. Carrier configuration server 500 may be used as any of carrier configuration servers 314, 316, or 318 in FIG. 3.

Carrier configuration server 500 is a data processing system that communicates with other data processing systems, including universal femto cells such as universal femto cell 200 in FIG. 2, using network 502. Network 502 may be a data network such as the Internet. Carrier configuration server 500 includes network communications component 504 that communicates with a network such as network 502. Web server 506 is an exemplary component for facilitating a user's interactions with carrier configuration server 500. Using web server 506, carrier configuration server 500 may present information and accept information from the user, such as a system administrator. Web server 506 may be an optional component in a particular implementation of carrier configuration server 500. Alternatively, other methods of interacting with the user may substitute for web server 506. For example, a set of lights and buttons, a built in liquid crystal display (LCD) with buttons or touch-screen, or other methods for input/output of information may be used in place of web server 506.

Carrier configuration server 500 includes storage 510. Storage 510 stores account information 512. Account information 512 includes subscriber information 514 and device information 516. Storage 510 further includes configuration instructions 518, and other instructions 520. Storage 510 may be a readable writable data storage medium such as memory, hard disk or other suitable storage media. Furthermore, any of account information 512, configuration instructions 518, and other instructions 520 may reside in storage 510, or in a different location, or removable media, such as a compact disc or a flash storage card.

Subscriber information 514 may include information about users of a wireless carrier's services. Typically, subscriber information 514 includes a subscriber name, billing information, wireless service plan information and other information used by the wireless carrier in providing wireless services to the subscribers.

Device information 516 may include identifying information that identifies a universal femto cell that requests configuration instructions 518. A universal femto cell may be identified in device information 516 in the manner described above. Additionally, device information 516 may store information common to a genre of universal femto cells, such as a universal femto cells having a common manufacturer, model, or type.

Account information 512 may be used to verify that the subscriber information provided by a user of a universal femto cell is valid for the wireless carrier that may be operating carrier configuration server 500. Account information 512 may also be used to verify that the universal femto cell requesting configuration instructions 518 is allowed to receive it in response. For example, a subscriber of wireless carrier ABC may not be able to configure the user's universal femto cell using wireless carrier XYZ's carrier configuration server. As another example, wireless carrier ABC may not support universal femto cells manufactured by a particular manufacturer, and such universal femto cells, although belonging to a valid subscriber, may not receive configuration instructions 518. Account information 512 may also be used to simply keep track of statistics, such as—which subscriber, how many subscribers, which universal femto cells, or how many universal femto cells requested configuration instructions 518.

Other instructions 520 may include instructions for testing the configuration once a universal femto cell has been configured according to configuration instructions 518. Other examples of other instructions 520 may include instructions for diagnostic functions, corrective functions, post-configuration functions, and informative functions.

Block diagrams in FIGS. 4 and 5 are provided only for clarity of the description of the illustrative embodiments and are not intended to be limiting on the illustrative embodiments. Depicted components may be combined, omitted, or modified, and additional components may be added to suit a particular environment without departing from the scope or spirit of the illustrative embodiments. Furthermore, in one embodiment, master configuration server and carrier configuration server may be combined together, such as by being addressable using the same IP address.

With reference to FIG. 6, this figure depicts a timing diagram of an exemplary operation of an improved wireless communication network in accordance with an illustrative embodiment. Timing diagram 600 may represent the operation of improved wireless communication network 300 in FIG. 3.

User 602 may be a user of a wireless carrier's services, and may be the individual installing universal femto cell 604. Universal femto cell 604 may be implemented using universal femto cell 304. Master configuration server 606 may be implemented using master configuration server 312. Carrier configuration server 608 may be implemented using any of carrier configuration servers 314-318.

Install 622 is the installation of universal femto cell 604 by user 602. For example, with reference back to FIG. 3, installation occurs when universal femto cell 302 is in communication with networking device 304. During installation, networking device 304 may provide universal femto cell 302 a data communication path to Internet 310, such as by assigning an IP address to universal femto cell 302.

A universal femto cell being freshly configured may contain information to communicate with a master configuration server. For example, a newly purchased universal femto cell may have the IP address of a specific master configuration server stored in the universal femto cell such that upon gaining access to Internet, the universal femto cell may communicate with that specific master configuration server. If universal femto cell 604 contains similar information, universal femto cell 604 may communicate with master configuration server 606 and send a request for carrier configuration list 624.

Master configuration server 606 may respond to universal femto cell 604 with a carrier configuration list that it maintains, and any other additional information, in carrier configuration list and other optional information 626. Other optional information may include information such as contact information for wireless carriers' technical support department.

Universal femto cell 604 may present user 602 a user interface, such as a web page served by web server 206 in FIG. 2. Using the user interface, user 602 may perform login 628, which allows universal femto cell 604 to provide information to user 602 and accept information from user 602. For example, universal femto cell 604 may provide user 602 the carrier configuration list received from master configuration server 606. User 602 may choose carrier 630 by choosing one or more carriers from the carrier configuration list. User 602 may further provide user information 632, such as the users account number, equipment serial number (ESN) of the user's wireless communication device, and other information for configuration.

Using the information in the carrier configuration list received from master configuration server 606, and inputs received from user 602, universal femto cell 604 performs submit 634 to carrier configuration server 608. Carrier configuration server 608 provides configuration instructions and any additional instructions 636 to universal femto cell 604. Additional instructions may include instructions for testing the configuration once universal femto cell 604 has been configured according to the configuration instructions. Other examples of additional instructions 636 may include instructions for diagnostic functions, corrective functions, post-configuration functions, and informative functions.

Above operations are only exemplary and have been selected for clarity of the description of the illustrative embodiment. Other operations in addition to or in lieu of those described above are conceivable from this disclosure. Furthermore, the operations described above may be performed in a different order without departing from the scope and spirit of the illustrative embodiment. For example, a particular implementation of the universal femto cell may display informational messages to the user while communicating with the carrier configuration server. As another example, if an error in encountered during any of the operational steps, the universal femto cell may display error messages or suggestions to the user, or perform corrective operations, which are not shown, before proceeding with a described operation. Additionally, as described above, master configuration server 606 and carrier configuration server 608 may be the same server, or appear to be the same server.

With reference to FIG. 7, this figure depicts an exemplary carrier configuration list maintained by a master configuration server in accordance with an illustrative embodiment. List 700 may be maintained by master configuration server 312 in FIG. 3.

In the exemplary carrier configuration list depicted as list 700, column 702 entitled "Wireless carrier" records the identity of the various wireless carriers that support femto cells and universal femto cells on their wireless communication network Column 704 entitled "wireless carrier's URL for femto cell configuration" contains the website uniform resource locator (URL), or link where a universal femto cell may find the wireless carrier's configuration parameters for femto cells and universal femto cells.

Column 706 entitled "Wireless carrier's technical support website" and column 708 entitled "Wireless carrier's phone number" are examples of other information that a master configuration server may provide to a universal femto cell in a carrier configuration list. Entries in column 706 and 708 may provide information that a universal femto cell may display to a user, should the user need help in configuring the universal femto cell. A particular implementation of the illustrative embodiments may include other or different information not shown in list 700.

Figure 8:
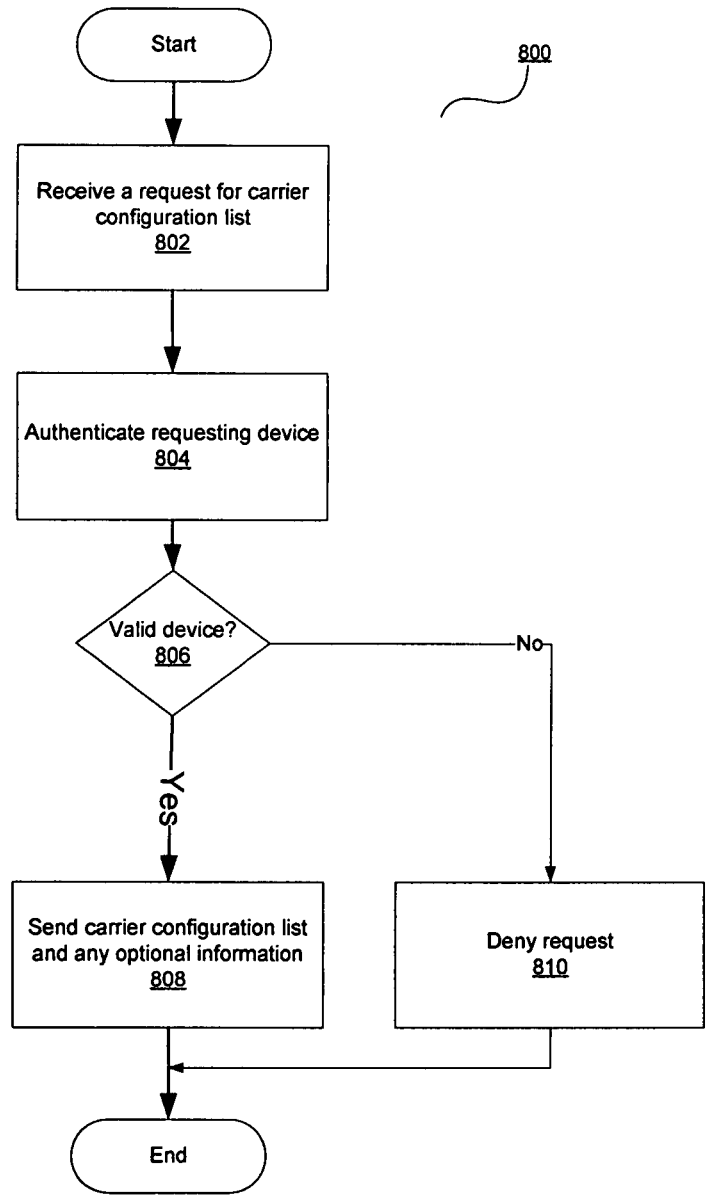
FIG. 8 depicts a process of configuring a universal femto cell in accordance with an illustrative embodiment.

With reference to FIG. 8, this figure depicts a process of configuring a universal femto cell in accordance with an illustrative embodiment. Process 800 may be implemented using master configuration server 400 in FIG. 4. The process begins by receiving a request for a carrier configuration list (step 802).

Before responding to the request of step 802, process 800 authenticates the requesting device (step 804). A requesting device is the device making the request, and may be a universal femto cell, such as universal femto cell 200 in FIG. 2. As described above with respect to FIG. 4, process 800 may utilize authentication information, such as authentication information 412 in FIG. 4 to accomplish step 804. In one embodiment of process 800, step 804 may be omitted and all requesting devices may receive the carrier configuration list.

If the requesting device is valid ("Yes" path of step 806), to with, the requesting device is authenticated using authentication information, process 800 sends the carrier configuration list and any optional information (step 808). The process ends thereafter.

If, however, the requesting device is not valid, to with, the requesting device cannot be authenticated using authentication information, the process denies the request (step 810). The process ends thereafter. A particular implementation of process 800 may notify the requesting device that the requesting device could not be authenticated, before the process ends.

Figure 9:
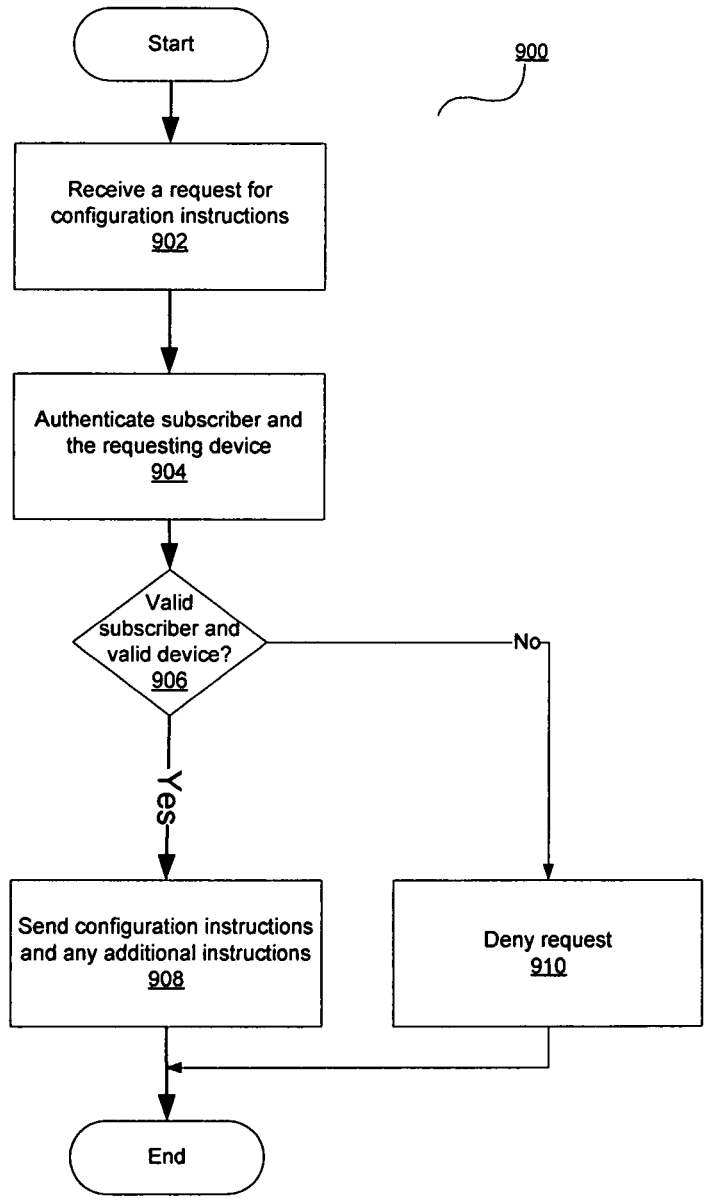
FIG. 9 depicts another process of configuring a universal femto cell in accordance with an illustrative embodiment.

With reference to FIG. 9, this figure depicts a process of configuring a universal femto cell in accordance with an illustrative embodiment. Process 900 may be implemented using carrier configuration server 500 in FIG. 5. The process begins by receiving a request for configuration instructions (step 902).

Before responding to the request of step 902, process 900 authenticates the subscriber as well as the requesting device (step 904). A requesting device may be a universal femto cell, such as universal femto cell 200 in FIG. 2. A subscriber, as described above, is a user of the wireless carrier's services and who is attempting to configure the universal femto cell on the wireless carrier's wireless communication network. As described above with respect to FIG. 5, process 900 may utilize authentication information, such as account information 512 in FIG. 5, including subscriber information 514 and device information 516 in FIG. 5, to accomplish step 904. In one embodiment of process 900, step 904 may be omitted and all requesting devices may receive the carrier configuration list. Alternatively, in another embodiment, step 904 may authenticate only the subscriber and not the requesting device. In another embodiment, step 904 may authenticate only the requesting device. Other authentications and variations of the described authentications are contemplated within the scope of the illustrative embodiments.

If the requesting device is valid and the subscriber is also valid ("Yes" path of step 906), process 900 sends the configuration instructions and any additional instructions (step 908). The process ends thereafter.

If, however, the requesting device is not valid, or the subscriber is not valid, or both, the process denies the request (step 910). The process ends thereafter. A particular implementation of process 900 may notify the requesting device that the requesting device could not be authenticated, before the process ends.

Note that the steps of processes 800 and 900 are arranged and described only as exemplary and are not intended to be limiting on the illustrative embodiment. Some steps may be omitted, combined, further broken down, re-arranged, re-ordered, re-formed, or modified for particular implementations without departing from the scope and spirit of the illustrative embodiments. For example, the steps of process 800 and 900 may be combined to create a unified process that may be executed on a data processing system acting as both the master configuration server and a carrier configuration server.

Thus, the illustrative embodiments describe a method, apparatus, and computer usable program product for configuring the universal femto cell. The universal femto cell and the corresponding method are described such that a user may configure the universal femto cell to operate with a wireless carrier of the user's choice. Furthermore, a universal femto cell according to the illustrative embodiments may be procured by a user independent of any pre-configuration by a wireless carrier, configure or re-configure the universal femto cell according to the user's preferences for operating on one or more wireless carrier's wireless communication networks.

A master configuration server according to the illustrative embodiments may be operated by a wireless carrier, the manufacturer of a universal femto cell, a third party, or all of them. In one embodiment, a universal femto cell may include a carrier configuration list, and may use only a carrier configuration server, bypassing the steps of process 800.

A wireless carrier may be able to expand the coverage of its wireless communication network through the deployment of the universal femto cells of the illustrative embodiments. Such expansion of coverage may be at a smaller expense to the wireless carrier when compared to the expense of expanding coverage using wireless carrier supplied femto cells or antenna towers. As wireless technologies evolve, the commonalities in the various wireless standards and operating parameters may make universal femto cells a preferred method of expanding coverage and giving the users more flexibility in consuming wireless communication services.

What is claimed:

1. A method for configuring universal femto cells, the method comprising:
    storing information about where to find carrier configuration information corresponding to a plurality of carriers;
    sending the information about where to find carrier configuration information corresponding to a plurality of wireless carriers to a universal femto cell, wherein the universal femto cell is a femto cell that includes functionality of at least a base transceiver station ("BTS");
    receiving a user selection from a user of the universal femto cell for selecting a wireless carrier from among the information; and
    configuring the universal femto cell such that the universal femto cell operates on a wireless communication network of the selected wireless carrier, based at least in part on the received user selection, by sending carrier configuration instructions for the wireless carrier to the universal femto cell.

2. The method of claim 1, wherein sending the information is responsive to a request for the information about where to find carrier configuration information.

3. The method of claim 1, further comprising sending carrier configuration instructions for a wireless carrier selected from the plurality of wireless carriers to the universal femto cell, and wherein sending the carrier configuration instructions is responsive to a request for carrier configuration instructions from the wireless carrier.

4. The method of claim 3, wherein sending the information and sending the carrier configuration instructions are performed by one of one data processing system or different data processing systems.

5. The method of claim 1, further comprising:
    sending optional information, wherein the optional information includes one or more of contact information, firmware update, driver update, software update, an information bulletin, advertisement, marketing message, or welcome message, to the universal femto cell.

6. The method of claim 3, further comprising:
    sending additional instructions, wherein the additional instructions include instructions for one or more of testing functions, diagnostic functions, corrective functions, post-configuration functions, or informative functions, to the universal femto cell.

7. The method of claim 1, further comprising:
    authenticating the universal femto cell.

8. The method of claim 1, further comprising:
    authenticating one or more of a user or the universal femto cell.

9. The method of claim 3, further comprising:
    repeating sending the carrier configuration instructions for each wireless carrier in a plurality of selected wireless carriers, wherein the plurality of selected wireless carriers is a subset of the plurality of wireless carriers.

10. The method of claim 1, further comprising:
    resetting the universal femto cell.

11. A system for configuring-a universal femto cells, the system comprising:
    a first storage component that stores information about where to find carrier configuration information corresponding to a plurality of wireless carriers; and
    a first sending component that sends the information about where to find carrier configuration information corresponding to the plurality of wireless carriers to a universal femto cell, wherein the universal femto cell is a femto cell that includes functionality of at least a base transceiver station ("BTS");
a first user selection component that receives a user selection from a user of the universal femto cell for selecting a wireless carrier from among the information: and
a second sending component that sends carrier configuration instructions for the wireless carrier to the universal femto cell such that, using the carrier configuration instructions, the universal femto cell is configured to operate on a wireless communication network of the wireless carrier, based at least in part on the received user selection.

12. The system of claim 11, further comprising:
a first receiving component for receiving a request for the information about where to find carrier configuration information.

13. The system of claim 12, further comprising:
a second receiving component for receiving a request for carrier configuration instructions from the wireless carrier.

14. The system of claim 13, wherein the first receiving component and the second receiving component are one and the same.

15. The system of claim 11, wherein the first sending component and the second sending component are one and the same.

16. The system of claim 11, further comprising a second storage component for storing carrier configuration instructions for a wireless carrier, the wireless carrier being one of the plurality of wireless carriers, and wherein the first storage component and the second storage component are one and the same.

17. The system of claim 11, wherein the first storage component further stores optional information, wherein the optional information includes one or more of contact information, firmware update, driver update, software update, an information bulletin, advertisement, marketing message, or welcome message.

18. The system of claim 16, wherein the second storage component further stores additional instructions, wherein the additional instructions include instructions for one or more of testing functions, diagnostic functions, corrective functions, post-configuration functions, or informative functions.

19. The system of claim 11, wherein the first storage component further stores authentication information to authenticate the universal femto cell.

20. The system, of claim 16, wherein the second storage component further stores account information to authenticate one or more of a user or the universal femto cell.

21. A computer usable program product in a non-transitory computer readable medium storing computer executable instructions being executed on a networked computing system the computer executable instructions that, when executed, cause the computing system to:
store information about where to find carrier configuration information corresponding to a plurality of carriers; and
send information about where to find carrier configuration information corresponding to a plurality of wireless carriers to a universal femto cell, wherein the universal femto cell is a femto cell that includes functionality of at least a base transceiver station ("BTS");
receive a user selection from a user of the universal femto cell for selecting a wireless carrier from among the information; and
send carrier configuration instructions for the wireless carrier to the universal femto cell such that the universal femto cell operates on a wireless communication network of the wireless carrier, based at least in part on the received user selection.

22. The computer usable program product of claim 21, wherein sending the information is responsive to a request for the information about where to find carrier configuration information.

23. The computer usable program product of claim 21, wherein the computer executable instructions, when executed, further cause the computing system to send carrier configuration instructions responsive to a request for carrier configuration instructions from the wireless carrier.

24. The computer usable program product of claim 21, wherein the computing system that is caused to send the information comprises one of one data processing system or different data processing systems.

25. The computer usable program product of claim 21, the computer executable instructions, when executed, further cause the computing system to:
send optional information, wherein the optional information includes one or more of contact information, firmware update, driver update, software update, an information bulletin, advertisement, marketing message, or welcome message, to the universal femto cell.

26. The computer usable program product of claim 21, the computer executable instructions, when executed, further cause the computing system to:
send additional instructions, wherein the additional instructions include instructions for one or more of testing functions, diagnostic functions, corrective functions, post-configuration functions, or informative functions, to the universal femto cell.

27. The computer usable program product of claim 21, the computer executable instructions, when executed, further cause the computing system to:
authenticate the universal femto cell.

28. The computer usable program product of claim 21, the computer executable instructions, when executed, further cause the computing system to:
authenticate one or more of a user or the universal femto cell.

29. The computer usable program product of claim 21, the computer executable instructions, when executed, further cause the computing system to:
repeat sending carrier configuration instructions for each wireless carrier in a plurality of selected wireless carriers, wherein the plurality of selected wireless carriers is a subset of the plurality of wireless carriers.

30. The computer usable program product of claim 21, the computer executable instructions, when executed, further cause the computing system to:
reset the universal femto cell.

* * * * *